(12) United States Patent
Bercovich

(10) Patent No.: US 11,431,775 B2
(45) Date of Patent: Aug. 30, 2022

(54) SYSTEM AND METHOD FOR DATA STREAM SYNCHRONIZATION

(71) Applicant: W.S.C. SPORTS TECHNOLOGIES LTD., Bene Beraq (IL)

(72) Inventor: Amos Bercovich, Rosh Haayin (IL)

(73) Assignee: W.S.C. SPORTS TECHNOLOGIES LTD., Givatayim (IL)

(*) Notice: Subject to any disclaimer, the term of this patent is extended or adjusted under 35 U.S.C. 154(b) by 0 days.

(21) Appl. No.: 16/689,148

(22) Filed: Nov. 20, 2019

(65) Prior Publication Data

US 2021/0152619 A1 May 20, 2021

(51) Int. Cl.
*G06F 15/16* (2006.01)
*H04L 65/60* (2022.01)
*H04L 65/61* (2022.01)
*H04L 65/1083* (2022.01)

(52) U.S. Cl.
CPC ........ *H04L 65/602* (2013.01); *H04L 65/1083* (2013.01); *H04L 65/4069* (2013.01)

(58) Field of Classification Search
CPC ............... H04L 65/602; H04L 65/1083; H04L 65/4069
USPC ........................................................ 709/219
See application file for complete search history.

(56) References Cited

U.S. PATENT DOCUMENTS

| | | | | |
|---|---|---|---|---|
| 9,432,629 B2* | 8/2016 | Olsen, Jr. | ......... | H04N 21/47202 |
| 9,438,937 B1* | 9/2016 | Buchheit | ................. | H04N 5/04 |
| 2003/0182620 A1* | 9/2003 | Errico | .............. | H04N 21/23614 715/202 |
| 2005/0276282 A1* | 12/2005 | Wells | ................. | H04N 21/4341 370/503 |
| 2011/0273455 A1 | 11/2011 | Powar et al. | | |
| 2012/0307145 A1* | 12/2012 | Buchheit | .......... | H04N 21/43079 348/E5.009 |
| 2013/0057761 A1* | 3/2013 | Bloom | ............... | H04N 21/4394 348/515 |
| 2014/0280265 A1* | 9/2014 | Wang | ..................... | H04H 60/37 707/758 |
| 2015/0281751 A1 | 10/2015 | Nemiroff et al. | | |

(Continued)

OTHER PUBLICATIONS

Salai et al., "Stress Detection Using Low Cost Heart Rate Sensors", Journal of Healthcare Engineering, vol. 2016 |Article ID 5136705 | 13 pages, Jun. 2016 (Year: 2016).*

(Continued)

*Primary Examiner* — Taylor A Elfervig
(74) *Attorney, Agent, or Firm* — Pearl Cohen Zedek Latzer Baratz LLP

(57) ABSTRACT

Systems and methods of synchronizing multiple media streams, including identifying a time stamp for a plurality of cuts in a master stream, identifying a corresponding time stamp for each of a plurality of cuts in at least one secondary stream, determining a first set of time differences between the identified time stamps of consecutive cuts in the master stream and at least a second set of time differences between the identified time stamps of consecutive cuts in the at least one secondary stream, calculating at least one time offset between the master stream and at least one secondary stream for each pair of consecutive cuts in the master stream, and synchronizing the master stream and the secondary stream based on the at least one time offset.

14 Claims, 5 Drawing Sheets

(56) References Cited

U.S. PATENT DOCUMENTS

| | | | |
|---|---|---|---|
| 2016/0088222 A1* | 3/2016 | Jenny | H04N 5/265 |
| | | | 348/36 |
| 2016/0105689 A1* | 4/2016 | Sörlander | H04N 21/4425 |
| | | | 375/240.27 |
| 2016/0132600 A1* | 5/2016 | Woodhead | G06F 16/7837 |
| | | | 707/754 |
| 2017/0094341 A1 | 3/2017 | Berner et al. | |
| 2017/0332131 A1* | 11/2017 | Opsenica | H04N 21/4307 |
| 2018/0007112 A1* | 1/2018 | Kerfeldt | H04N 21/2365 |
| 2018/0152496 A1* | 5/2018 | Wilson | H04L 65/4069 |
| 2018/0367591 A1 | 12/2018 | Alm et al. | |
| 2019/0104165 A1 | 4/2019 | Akerfeldt | |

OTHER PUBLICATIONS

Prarthana Shrestha, Hans Weda, Mauro Barbieri, and Dragan Sekulovski. 2006. Synchronization of multiple video recordings based on still camera flashes. In Proceedings of the 14th ACM international conference on Multimedia (MM '06). Association for Computing Machinery, New York, NY, USA, 137-140. (Year: 2006).*

P. Shrestha, M. Barbieri, H. Weda and D. Sekulovski, "Synchronization of Multiple Camera Videos Using Audio-Visual Features," in IEEE Transactions on Multimedia, vol. 12, No. 1, pp. 79-92, Jan. 2010 (Year: 2010).*

Xie et al., "Adaptive multimedia synchronization in a teleconference system", 1999, Multimedia System, p. 326-337, Dept of EE, City Univ. of NY (Year: 1999).*

International Search Report and Written Opinion for PCT Application No. PCT/IL2020/051201 dated Mar. 1, 2021.

\* cited by examiner

SYSTEM AND METHOD FOR DATA STREAM SYNCHRONIZATION

FIELD OF THE INVENTION

The present invention relates to media systems. More particularly, the present invention relates to systems and methods for synchronizing data streams in media systems.

BACKGROUND OF THE INVENTION

Many entertainment systems can provide real time content to users all over the world, for instance media systems providing content (e.g., sport events or music concerts) over the internet, or via a satellite broadcast.

Media content is usually provided and/or broadcasted in multiple streams, such as video streams or audio streams, to different locations and might sometimes be unsynchronized due to technological constraints of broadcasting equipment or of decoders and/or due to network architecture. For example, a user that views a basketball game in Spain (e.g., via online streaming over the internet) might receive a video stream that is not synchronized with another viewer in France watching the same game.

Some entertainment providers that want to provide additional information on the broadcasted content (e.g., display captions on real time events) usually use manual tagging on predefined events in the media stream. For example, certain actions in the video stream of a music concert can be manually tagged or labeled (e.g., as a song title or a guitar solo by particular band member), such that the viewer sees the labels displayed in real time for each new scene or action.

During such manual labeling, the start time and end time of each event can be manually identified, for instance for each stream separately. In a typical process, each media stream is separately manually labelled, by identifying different events in the stream. Such manual labeling can be time consuming and not always accurate due to human error. It is therefore desired to have a way to automatically label events in various media streams.

SUMMARY

There is thus provided, in accordance with some embodiments of the invention, a method of synchronizing multiple media streams, including: identifying a time stamp for a plurality of cuts in a master stream; identifying a corresponding time stamp for each of a plurality of corresponding cuts in at least one secondary stream; determining a first set of time differences between the identified time stamps of each pair of consecutive cuts in the master stream; determining at least a second set of time differences between the identified corresponding time stamps of each pair of corresponding consecutive cuts in the at least one secondary stream; calculating at least one time offset between the master stream and the at least one secondary stream for each pair of consecutive cuts in the master stream; and synchronizing the master stream and the secondary stream based on the at least one time offset.

In some embodiments of the invention, at least one scene in the master stream may correspond to at least one scene in the at least one secondary stream. This correspondence may be determined based on the determined first set of time differences and the at least second set of time differences. The calculation of the at least one time offset between the master stream and the at least one secondary stream may include, for each of the at least one scene in the master stream, calculating a time offset between a start and/or end time of the at least one scene in the master stream and a start and/or end time of the at least one corresponding scene in the at least one secondary stream. The at least one scene may be labeled in the master stream corresponding to at least one cut, and at least one scene may be labeled in the at least one secondary stream based on the calculated at least one time offset and the labeling of the master stream. The at least one cut may be a cut immediately before the start of the at least one scene or immediately after the end of the at least one scene In some embodiments, labeling of the at least one scene in the at least one secondary stream may be based on the calculated at least one time offset that is closest to corresponding time stamp of the master stream. In some embodiments, the master stream may be automatically selected from the multiple media streams. In some embodiments, a histogram may be calculated for the time offsets to find at least one time offset that is closest to corresponding time stamp of the master stream. In some embodiments, each media stream may include a plurality of media chunks, and the cuts may be determined for each such media chunk. In some embodiments, a minimum absolute error (MAE) may be calculated for at least one of the master stream and the secondary stream, wherein at least one time offset that is closest to corresponding time stamp of the master stream may be determined based on the closest MAE.

There is thus provided, in accordance with some embodiments of the invention, a system for media stream synchronization, including a processor and a database, coupled to the processor and including a master stream and at least one secondary stream of a media stream, wherein the processor may be configured to: identify a time stamp for each of a plurality of cuts in the master stream, identify a corresponding time stamp for each of a plurality of corresponding cuts in the at least one secondary stream, determine a first set of time differences between the identified time stamps of each pair of consecutive cuts in the master stream; determine at least a second set of time differences between the identified corresponding time stamps of each pair of consecutive cuts in the at least one secondary stream, calculate at least one time offset between the master stream and at least one secondary stream for each pair of consecutive cuts in the master stream, and synchronize the master stream and the secondary stream based on the at least one time offset.

In some embodiments, the processor may be configured to label at least one scene in the master stream corresponding to at least one cut, and label at least one scene in the at least one secondary stream based on the calculated at least one time offset. In some embodiments, labeling of the at least one scene in the at least one secondary stream may be based on the calculated at least one time offset that is closest to corresponding time stamp of the master stream. In some embodiments, each media stream may include a plurality of media chunks, and wherein the cuts are determined for each such media chunk. In some embodiments, the processor may be configured to automatically select the master stream from the multiple media streams. In some embodiments, processor may be configured to calculate a histogram for the time offsets to find at least one time offset that is closest to corresponding time stamp of the master stream. In some embodiments, the processor may be configured to calculate a minimum absolute error (MAE) for at least one of the master stream and the secondary stream, wherein at least one time offset that is closest to corresponding time stamp of the master stream may be determined based on the closest MAE.

There is thus provided, in accordance with some embodiments of the invention, a method of synchronizing multiple media streams with a received master media stream, wherein the received master stream includes a time stamp for a plurality of cuts in the master stream, including identifying a corresponding time stamp for each of a plurality of corresponding cuts in at least one secondary stream; determining a first set of time differences between the identified time stamps of each pair of consecutive cuts in the master stream; determining at least a second set of time differences between the identified corresponding time stamps of each pair of consecutive cuts in the at least one secondary stream; calculating at least one time offset between the master stream and at least one secondary stream for each determined time difference between each pair of consecutive cuts in the master stream; and synchronizing the master stream and the secondary stream based on the at least one time offset.

In some embodiments, at least one scene in the master stream may be labeled corresponding to at least one cut, and at least one scene in the at least one secondary stream may be labeled based on the calculated at least one time offset and the labeling of the master stream. In some embodiments, labeling of the at least one scene in the at least one secondary stream may be based on the calculated at least one time offset that is closest to corresponding time stamp of the master stream. In some embodiments, a histogram may be calculated for the time offsets to find at least one time offset that is closest to corresponding time stamp of the master stream. In some embodiments, each media stream may include a plurality of media chunks, and wherein the cuts are determined for each such media chunk. In some embodiments, a minimum absolute error (MAE) may be calculated for at least one of the master stream and the secondary stream, wherein at least one time offset that is closest to corresponding time stamp of the master stream may be determined based on the closest MAE.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
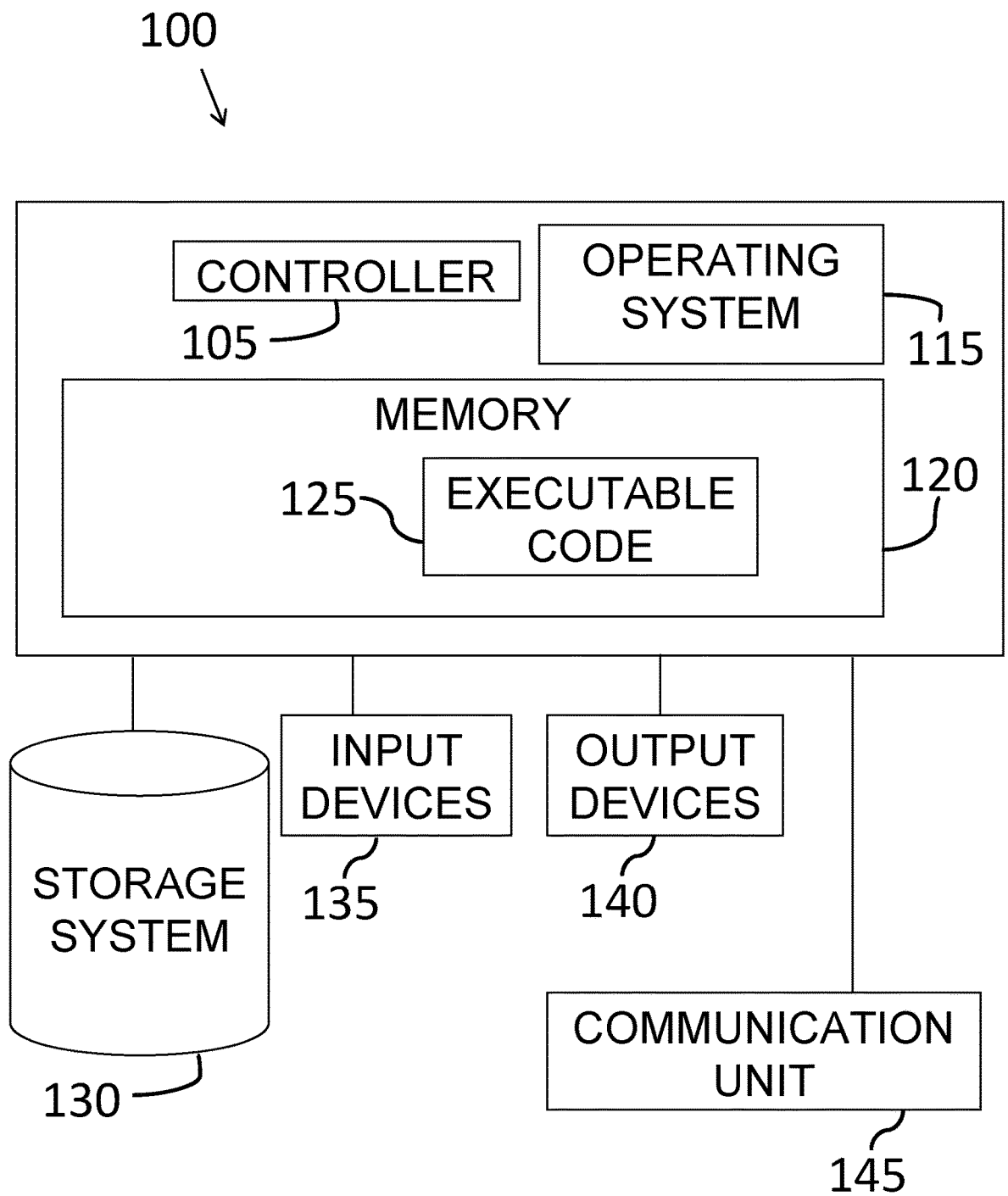
FIG. 1 shows a block diagram of an exemplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device 100, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. Embodiments of the invention described herein may include one or more computing device 100, for example, to act as the various devices or the components in system 200 shown in FIG. 2. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs synchronization of multiple media stream, identification of a time stamp, determination of time differences, calculation of time offsets, etc. as further described herein. Although, for the sake of clarity, a single item of executable code 125 is shown in FIG. 1, a embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. Data, such as time stamps or labels, may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article, such as a computer or processor non-transitory readable medium, or a computer or processor non-transitory storage medium, such as, for example, a memory, a disk drive, or a USB flash memory, encoding, including or storing instructions, e.g., computer-executable instructions, which, when executed by a processor or controller, carry out methods disclosed herein. For example, an article may include a storage medium, such as memory 120, computer-executable instructions, such as executable code 125, and a controller, such as controller 105. Such a non-transitory computer readable medium may be, for example, a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices, such as read-only memories (ROMs) and/or random access memories (RAMs), flash memories, electrically erasable programmable read-only memories (EEPROMs) or any type of media suitable for storing electronic instructions, including programmable storage devices. For example, in some embodiments of the invention, memory 120 may be a non-transitory machine-readable medium.

Embodiments of the invention may include components, such as, but not limited to, a plurality of central processing units (CPU) or any other suitable multi-purpose or specific processors or controllers (e.g., controller 105 of FIG. 1), a plurality of input units, a plurality of output units, a plurality of memory units, and a plurality of storage units. Embodiments of the invention may additionally include other suitable hardware components and/or software components. Some embodiments of the invention may include or may be, for example, a personal computer, a desktop computer, a laptop computer, a workstation, a server computer, a network device, or any other suitable computing device. For example, embodiments of the invention may include one or more facility computing device (e.g., computing device 100 of FIG. 1) and one or more remote server computers in active communication with the one or more facility computing device, and in active communication with one or more portable or mobile devices such as smartphones, tablets and the like.

Figure 2:
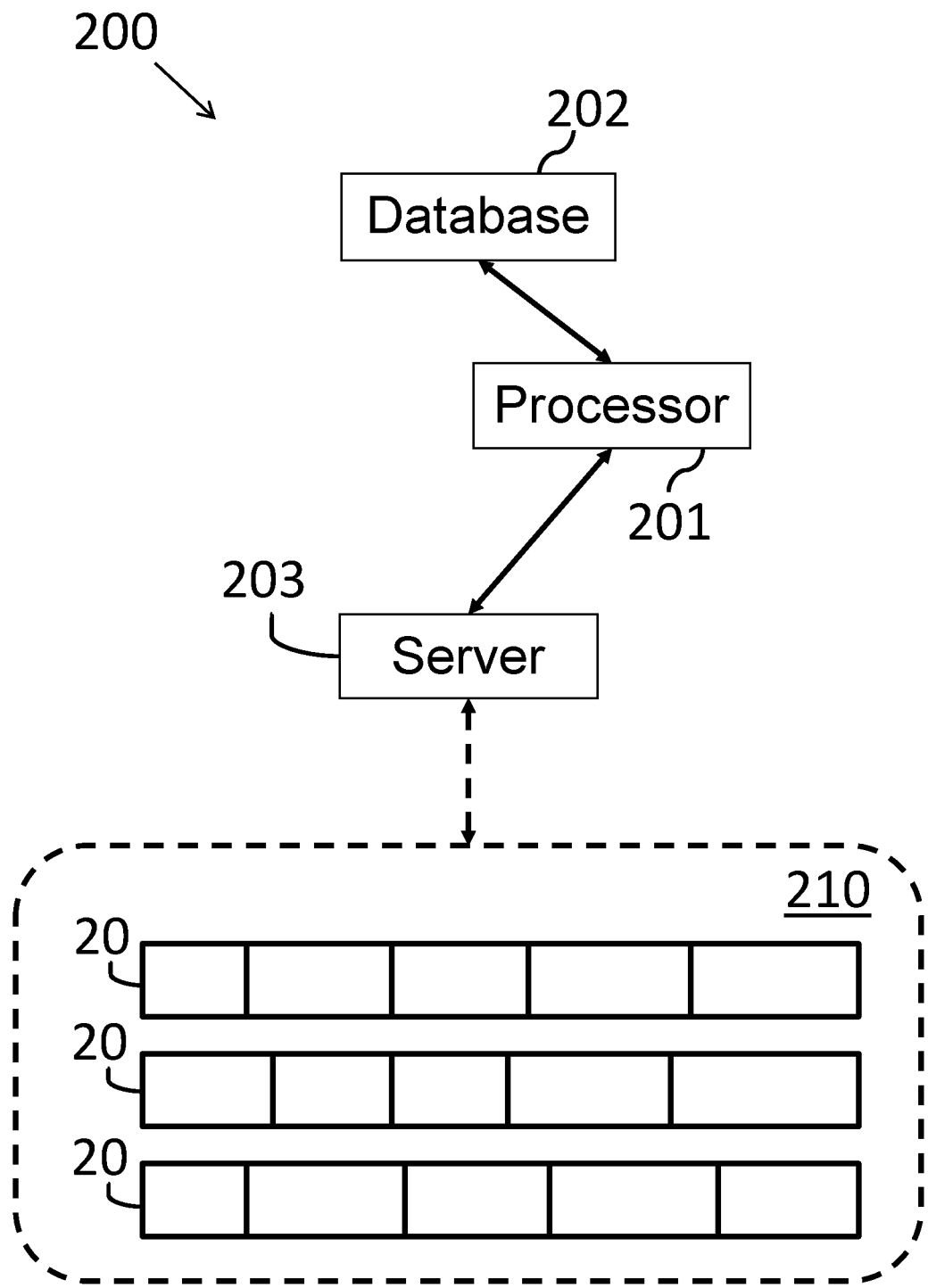
FIG. 2 shows a block diagram of a data synchronization system, according to some embodiments of the invention.

Reference is now made to FIG. 2, which shows a block diagram of a data synchronization system 200, according to some embodiments of the invention. In FIG. 2, the direction of arrows may indicate the direction of information flow.

Data synchronization system 200 may include at least one processor 201 (such as controller 105, shown in FIG. 1) and at least one database 202 (e.g., located on memory 120 or storage system 130 of FIG. 1) coupled thereto. The at least one processor 201 may receive data, for instance media streams 20, from an external source 210 via a server 203, and the received data may be stored on the at least one database 202, by processor 201. For example, server 203 may be connected to an entertainment system 210 (e.g., for internet or TV broadcasting), such that server 203 may forward video streams 20 to the processor 201 for analysis (e.g., to determine time stamps in a video stream), modification, and/or synchronization of labeling of events in media streams 20 (e.g., identify a label for a scene having different timing). It should be noted that media streams as used hereinafter may refer to any data including one or more of: images, text, audio, video, and/or the like, to be synchronized by data synchronization system 200. For example, for audio, the cut detection may be applied by the at least one processor 201 when silence and/or high voice are identified, and, for text, the cut detection may be applied by the at least one processor 201 based on timing between passages.

In some embodiments, the media streams 20 may include the same media content; however, the same media content in different media streams may be unsynchronized due to, for example, technological constraints of broadcasting equipment of the external source 210. For example, some technological constraints may include different broadcasting equipment in different regions causing different timing of the broadcast, such as older equipment in some regions that is uncapable of handling the same broadcasting speed. Thus, in order to label real time events in each of media streams 20, based on events that are labeled on a single master data stream, it is desirable for each of media streams 20 to be synchronized with the master data stream, as will be further described below. The master stream may be a single media stream upon which other media streams may be synchronized. Some known methods such as "shot transition detection" and/or "cut detection" may be used to identify multiple time stamps in each of the media streams 20 based on transitions or cuts in the media streams 20, such that each identified time stamp may indicate a different content item (e.g., a different scene). For example, the processor 201 may apply "cut detection" to identify scene changes (or cuts) in a video stream 20. Scene changes (or cuts) may be detected as a dark frame between different scenes where the processor 201 may identify such dark frames as scene changes. In some embodiments, at least one scene may be labeled in each media stream 20 corresponding to at least one cut, as further described in FIG. 3.

Multiple or "twin" streams (e.g., originating from a same video feed from the same camera showing the same frames of the event) may have the same content and/or content that differs in audio and/or advertisement in the video. For example, multiple or "twin" streams may have a gap in the timing of the broadcast. If the streams are synchronized, the gap may be overcome or corrected. In order to carry out media (e.g., video) stream synchronization, the time gap between the streams (e.g., the time difference between the same scene on different streams) may be calculated based on the scene changes (or cuts). Once a master stream is selected, the data synchronization system 200 may determine scene changes (or cuts) in each stream and calculate the time gap of each such change between each stream and the master stream in order to later synchronize all of the media streams 20.

Figure 3:
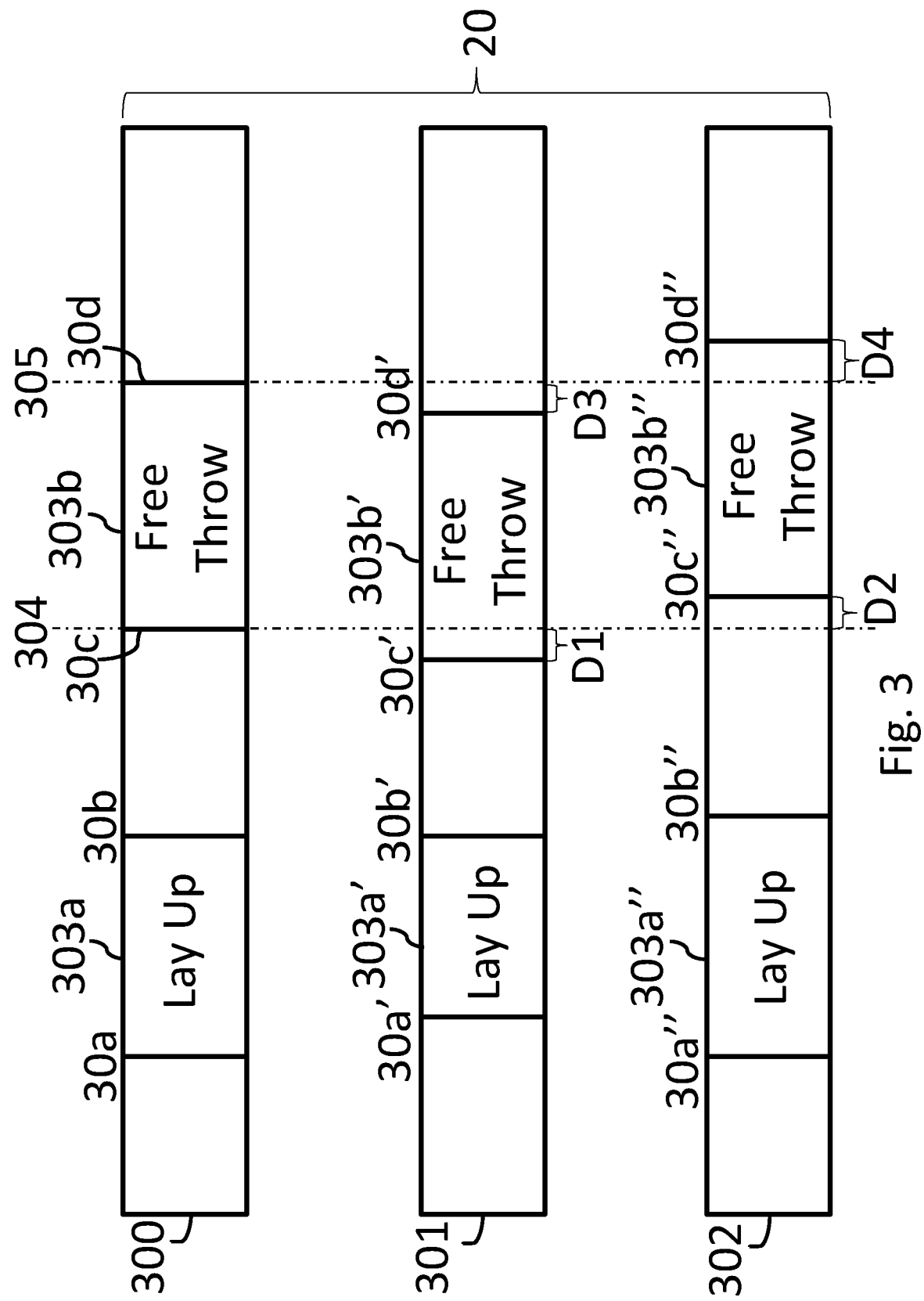
FIG. 3 schematically illustrates labeling of unsynchronized media streams, according to some embodiments of the invention.

Reference is now made to FIG. 3, which schematically illustrates labeling of unsynchronized media streams 20, according to some embodiments. It should be noted that only three media streams 20 are shown in FIG. 3 for illustrative purpose, and any number of multiple media streams may be similarly handled by the data synchronization system 200.

In some embodiments, a single media stream 20 may be automatically selected as a master stream 300, and, thus, the remaining media streams 20 may be indicated as secondary (or slave) streams 301, 302. For example, one media stream 20 may be randomly selected and/or the earliest stream may be selected as the master stream 300, and the other media streams 20 may be accordingly indicated as the at least one secondary stream 301, 302.

Processor 201 may apply "cut detection" techniques (e.g., in near real time) to identify multiple transitions and/or cuts (or scene changes) 30a-d, 30a'-d', and 30a"-d", in each media stream 300, 301, and 302, respectively. Due to the media streams 20 being unsynchronized, the processor 201 may identify cuts 30a'-d' and 30a"-d" between different scenes, in secondary streams 302 and 303, respectively, at slightly different times compared to cuts 30a-d of the corresponding scenes in the master stream 300; and/or identify actions 303a'-b' and 303a"-b" in the secondary streams 301 302, respectively, at slightly different times compared to actions 303a-b in the master stream 300, for instance with a variation of one second (e.g., variation D1=1 second). The media streams 20 may arrive in a format of several chunks (e.g., of about 3-5 or 10 seconds per chunk), with the data synchronization system 200 analyzing each of the chunks, for instance per media stream 20, to identify cuts (e.g., cuts when advertisement starts, for headshot, etc.).

For example, in a video stream of a music video clip, the cut detection technique may be applied to detect cuts or scene changes (e.g., detecting a change from an outdoor footage to focusing on a musical instrument indoors). In another example, in a live transmission of a basketball game, the cut detection technique may be applied to detect cuts 30a-b, 30a'-b', and 30a"-b" before and after a lay up 303a, 303a', and 303a", respectively, and may be applied to detect cuts 30c-d, 30c'-d', and 30c"-d" before and after a free throw 303b, 303b', and 303b", respectively, (having a different type of displayed action, such as different events in a particular sport or music video, for instance the action selected from a predefined list of action types) that may be transmitted with different timing in the master stream 300 and the secondary streams 301, 302. In some embodiments, cuts 30a-d, 30a'-d', and 30a"-d" may be identified in streams without knowing the specific type of action (e.g., lay-up 303a, 303a', and 303a"), such that the synchronization of timing occurs based on the cuts 30a-d, 30a'-d', and 30a"-d" only.

In some embodiments of the invention, processor 201 may identify a time stamp 304 and 305 for each of a plurality of cuts 30c, 30c', and 30c" in streams 300, 301 and 302, respectively, based on detected cuts in the media streams 20. The processor 201 may label at least one action and/or scene 303a and/or 303b in the master stream 300 corresponding to at least one cut 30a, 30b, 30c, and/or 30d. For instance, several image processing techniques may be applied to label scenes 303a and 303b in a video stream 300, for instance a scene 303b between two cuts 30c and 30d may be labeled in accordance with the displayed action or event (e.g., label a scene as "free throw" in a basketball game).

In some embodiments, processor 201 may calculate and/or determine time differences D1, D2, D3, D4 between the identified time stamps 304, 305 of consecutive cuts 30c-d, 30c'-d', and 30c"-d" (with corresponding scenes 303b, 303b', and 303b"), for streams 300, 301, and 302, respectively. For example, a scene 303b in the master stream 300 may be labeled as "free throw" (e.g., based on image processing by processor 201 from the same media source, or, for example, by an external source, such as analysis of audio commentary from a predefined commentary feed) in accordance with the event that is captured between time stamps 304, 305 of consecutive cuts 30c and 30d. In scenes 303b and 303b', at time stamp 304, there is a time difference D1 between the identified time stamp 304 of the master stream 300 and cut 30c' of the secondary stream 301. Similarly, there is a time difference D2 between the identified time stamp 304 of the master stream 300 and cut 30c" of the secondary stream 302. For scenes 303b and 303b' at time stamp 305, there is a time difference D3 between the identified time stamp 305 of the master stream 300 and the cut 30d' of the secondary stream 301. Similarly, there is a time difference D4 between the identified time stamp 305 of the master stream 300 and the cut 30d" of the secondary stream 302. Processor 201 may analyze these time differences D1-D4 in order to apply correct labeling to scenes in the secondary streams 301 and 302. In some embodiments, labeling may not be required.

In some embodiments, processor 201 may calculate at least one time offset between the master stream 300 and the at least one secondary stream 301 and 302 for each determined time difference D1, D2, D3, D4 between cuts 30c, 30c', 30c", 30d, 30d', and 30d". It should be noted that the calculated time offset may be used to set the start and end time of each action and/or scene 303b' and 303b" in each of the secondary streams 301 and 302. Thus, the processor 201 may label at least one action and/or scene 303b' and 303b" in the at least one secondary streams 301 and 302 based on the calculated at least one time offset, such that the start and end time for each action and/or scene 303 b' and 303b" may be set in the at least one secondary streams 301 and 302.

According to some embodiments, using the data synchronization system 200 may reduce the amount of personnel needed to "tag" unsynchronized media streams with time differences therebetween, as well as lower the total cost and amount of human errors, while performing faster labeling utilizing less computer resources (such as memory, CPU and GPU). It should be noted that automatic tagging and/or labeling may be faster and more accurate (and less subject to human error) compared to manual tagging carried out by a human tagger. This may be achieved due to the data synchronization system 200 only tagging a single stream (e.g., the master stream), and the rest of the streams are only measured to determine the time differences and not being tagged (while manual tagging may require tagging of the other streams as well). In contrast to previous methods, the data synchronization system 200 may automatically synchronize the streams and accordingly prevent the need for separate correction and/or tagging for each stream. For example, compared to previously known methods, the data synchronization system 200 may require computer resources that are about ten times smaller than used with previously known methods of media stream tagging where unsynchronized streams may require a large number of personnel for tagging. It should be noted that since the analysis and/or processing of the unsynchronized streams is carried out only once, the required computing power is for the final step to determine the time differences between the streams, thereby requiring less processing resources compared to previous methods where each media stream is analyzed separately.

While FIG. 3 shows three cuts per stream, there may be any number of cuts in each stream. According to some embodiments, for each identified cut, the data synchronization system 200 may store (e.g., in database 202) the time stamp of the cut in the media streams 20. For example, the master stream 300 and the secondary stream (e.g., 301 or 302) may have the following time stamps for cuts, where the numbers indicate time in seconds in the media stream:
MASTER STREAM: |10|14|16|17|20|22|23|25|28|32|36|38|
SECONDARY STREAM: |7|11|13|14|18|23|27|30|32|35|39|43|

For each media stream, the data synchronization system 200 may transform the absolute time to frequency by calculating the difference between consecutive cuts. For example, the master stream 300 may have the following time differences (in seconds) between each consecutive cut:
MASTER STREAM: |4|2|1|3|2|1|2|3|4|4|2|
Similarly, the secondary stream (e.g., 301 or 302) may have the following time differences (in seconds) between each consecutive cut:
SECONDARY STREAM: |4|2|1|4|5|4|3|2|3|4|4|

The processor 201 may divide each media stream into a predefined number 'N' of windows (e.g., define 'N'=3 cuts), such that synchronization of the scene labels may be carried out by calculating time differences for these windows. In some embodiments, the at least one secondary stream may be labeled only when at least one time offset that is closest to corresponding time stamp of the master stream is smaller than a predefined threshold.

In some embodiments, the processor 201 may cross correlate each such window over the frequency list of cuts for at the at least one of secondary streams 301 and 302 and determine the minimum absolute error (MAE) of these sets in case that the MAE result is less than a predetermined threshold (e.g., if MAE is smaller than two seconds). Thus, the absolute time offset may be calculated based on the determined MAE. The MAE may be calculated for at least one of the master stream 300 and the secondary streams 301 and 302, wherein at least one time offset that is closest to corresponding time stamp of the master stream may be determined based on the closest MAE.

In some embodiments, a timing offset histogram may be calculated for each action and/or scene 303 for each time difference D1, D2, D3, D4 between the master stream 300 and the at least one secondary streams 301 and 302. The histogram may be calculated for the time offsets to find at least one time offset D1, D2, D3, D4 that is closest to corresponding time stamps 304 and 305 of the master stream 300.

The most common offset with lowest average MAE may be selected in a recursive manner such that after a predetermined number of checks (e.g., after three recursive checks) the same offset is determined, and the memory (e.g., memory 120 of FIG. 1) may be cleared so that the algorithm starts from that point in the media stream, and thereby label the corresponding action and/or scene 303*a* or 303*b* in the at least one secondary stream 301 and 302 (e.g., scenes 303*a*' or 303*b*' in stream 301 and scenes 303*a*" or 303*b*" in stream 302) with the same label as the action and/or scene 303*a* or 303*b* in the master stream 300 despite the time difference.

According to some embodiments of the invention, processor 201 may receive a master media stream 300 with predefined cuts 30*a*-*d*, time stamps 304 and 305, and labeling of scenes 303*a* and 303*b*, such that analysis of time stamps and/or cuts 30*a*'-*d*' and 30*a*"-*d*" in the at least one secondary streams 301 and 302, respectively, may allow the processor 201 to modify the labeling of the corresponding scenes in the at least one secondary streams 301 and 302 based on calculated time difference with the received master stream 300. According to some embodiments, processor 201 may determine multiple labels for the same scene (e.g., 303*a* or 303*b*), for instance labels for "free throw", "game time", "scores" for a single basketball game scene.

Figure 4A:
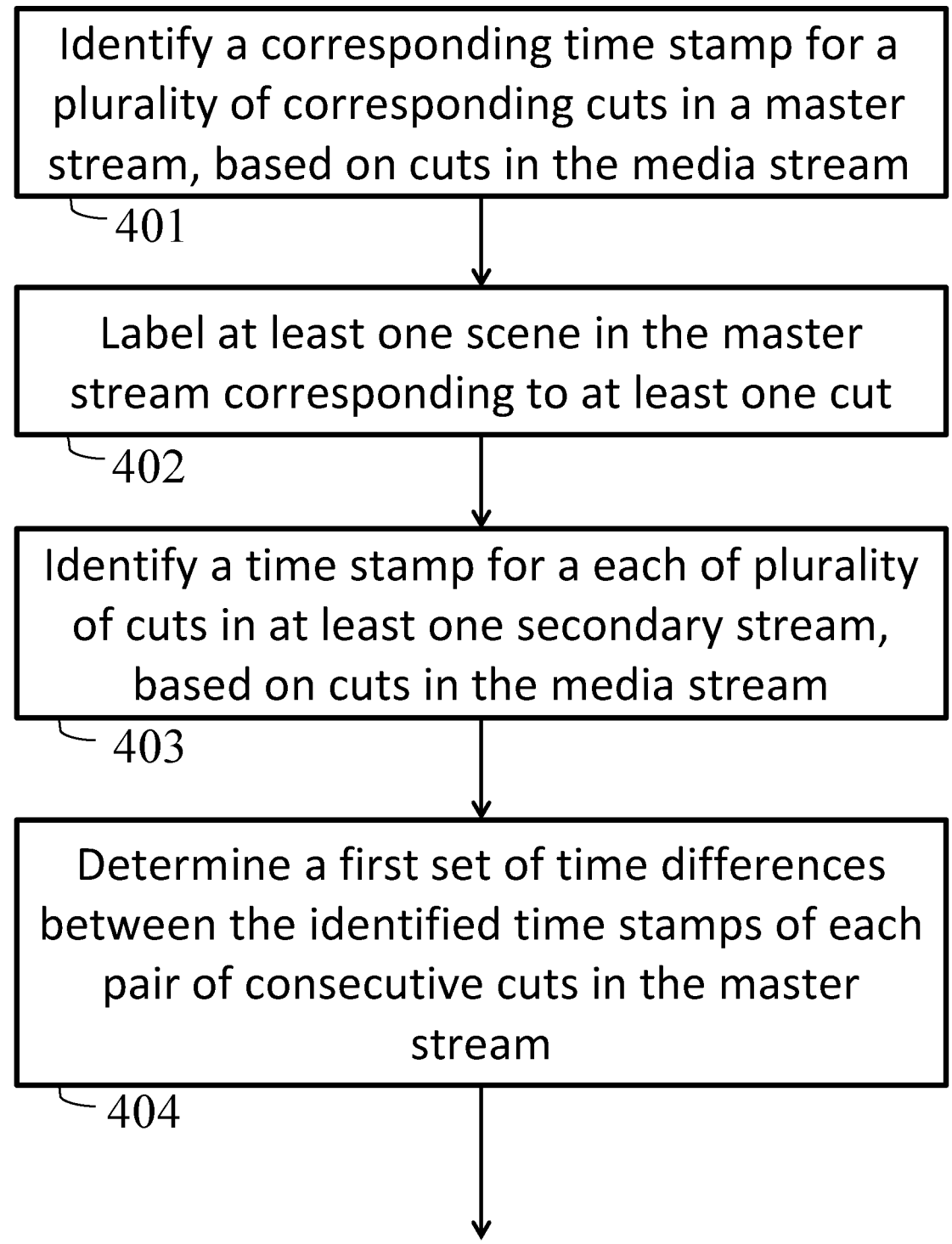
FIGS. 4A-4B show a flow chart for a method of synchronizing multiple media streams, according to some embodiments of the invention.
Figure 4B:
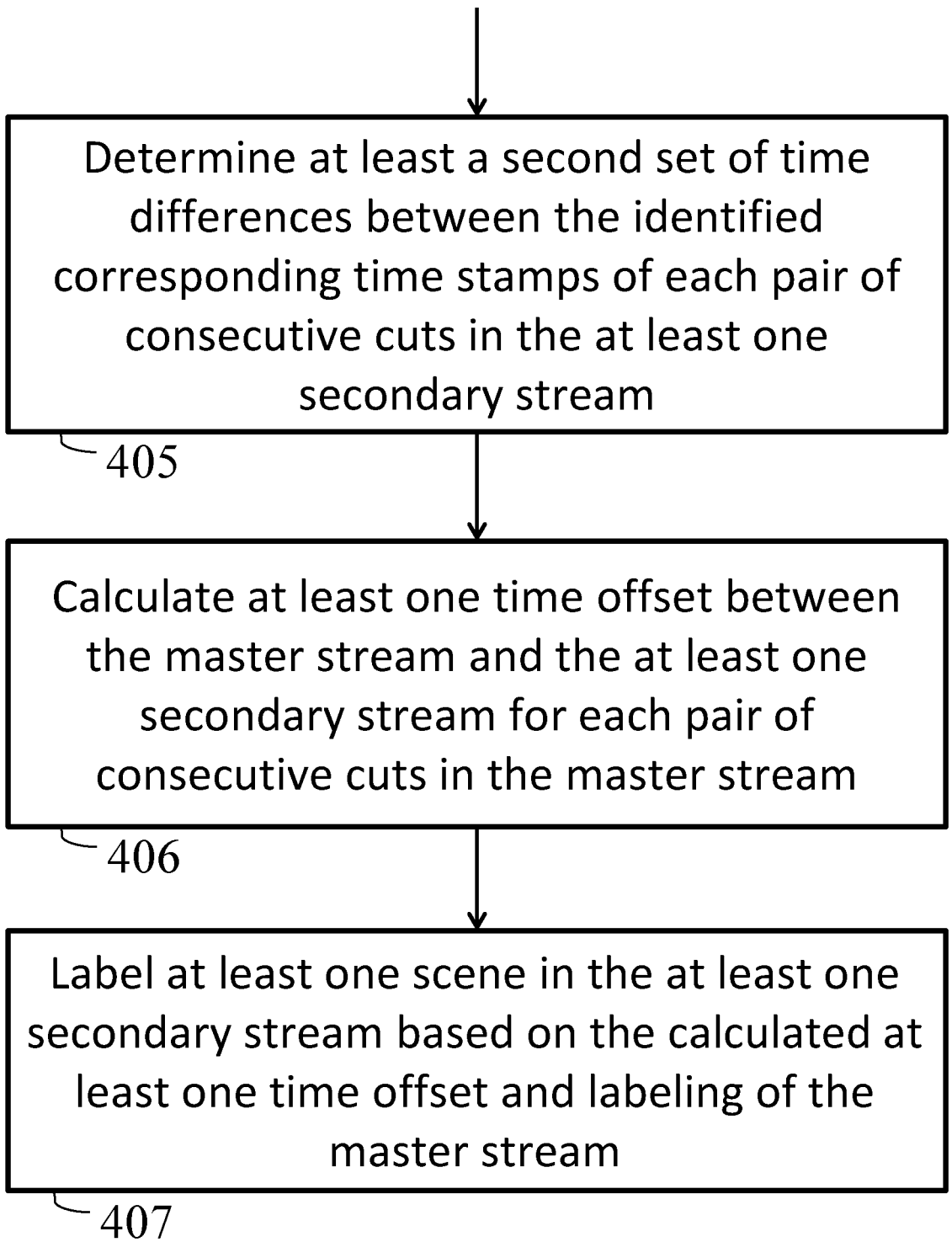

Reference is now made to FIGS. 4A-4B, which show a flow chart for a method of synchronizing multiple media streams, according to some embodiments of the invention. In some embodiments of the invention, the multiple media streams may be substantially identical streams of the same event with the only difference being a mis-synchronization problem. A time stamp may be identified 401 (e.g., by processor 201 in FIG. 2) for a plurality of cuts (e.g., cuts 30*a*-*b* in FIG. 3) in a master stream (e.g., master stream 300 in FIG. 3), based on cuts in the master media stream. In some embodiments of the invention, at least one scene (e.g., scenes 303*a* or 303*b* in FIG. 3) may be labeled 402 (e.g., by processor 201) in the master stream corresponding to at least one cut.

A time stamp may be identified 403 (e.g., by processor 201) for each of a plurality of cuts (e.g., cuts 30*a*'-*d*') in at least one secondary stream (e.g., secondary stream 301 or 302), based on the cuts in the secondary media stream. A first set of time differences between the identified time stamps of each pair of consecutive cuts in the master stream may be determined 404, and at least a second set of time differences between the identified corresponding time stamps of each pair of consecutive cuts in the at least one secondary stream may be determined 405.

At least one time offset may be calculated 406 between the master stream and at least one secondary stream for each determined time difference between cuts. In some embodiments, at least one scene may be labeled 407 in the at least one secondary stream based on the calculated at least one time offset and the labeling 402 of the master stream, for instance based on the calculated at least one time offset that is closest to corresponding time stamp of the master stream.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of synchronizing labeling of multiple video streams, the method comprising:
   identifying a time stamp for a plurality of cuts in a master video stream;
   identifying a corresponding time stamp for each of a plurality of corresponding cuts in at least one secondary video stream;
   determining a first set of time differences between the identified time stamps of each pair of consecutive cuts in the master video stream;
   determining at least a second set of time differences between the identified corresponding timestamps of each pair of corresponding consecutive cuts in the at least one secondary video stream;
   calculating at least one time offset between the master video stream and the at least one secondary video stream for each pair of consecutive cuts in the master video stream;
   repeatedly selecting the most common offset having an average minimum absolute error (MAE) below a predefined threshold, such that after a predetermined number of checks the same offset is determined, and starting from that point in the media stream; and
   labeling a scene in the at least one secondary video stream with the same label as the corresponding scene in the master stream despite the time difference.

2. The method of claim 1, further comprising corresponding at least one scene in the master video stream to at least one scene in the at least one secondary video stream based on the determined first set of time differences and the at least second set of time differences; wherein calculating the at least one time offset between the master video stream and the at least one secondary video stream comprises, for each of the at least one scene in the master video stream, calculating a time offset between at least one of a start time or end time of the at least one scene in the master video stream and at least one of a start time or end time of the at least one corresponding scene in the at least one secondary video stream.

3. The method of claim 2, further comprising:
   labeling the at least one scene in the master video stream corresponding to at least one cut, wherein the at least one cut is a cut immediately before the start of the at least one scene or immediately after the end of the at least one scene; and
   labeling the at least one scene in the at least one secondary video stream based on the calculated at least one time offset and the labeling of the master video stream.

4. The method of claim 1, further comprising automatically selecting the master video stream from the multiple video streams.

5. The method of claim 1, wherein each video stream comprises a plurality of video chunks, and wherein the cuts are determined for each such video chunk.

6. A system for video stream labeling synchronization, the system comprising:
   a processor; and
   a database, coupled to the processor and comprising a master video stream and at least one secondary video stream of a video stream;
   wherein the processor is configured to:
   identify a time stamp for each of a plurality of cuts in the master video stream;
   identify a corresponding time stamp for each of a plurality of corresponding cuts in the at least one secondary video stream;
   determine a first set of time differences between the identified time stamps of each pair of consecutive cuts in the master video stream;
   determine at least a second set of time differences between the identified corresponding time stamps of each pair of consecutive cuts in the at least one secondary video stream;
   calculate at least one time offset between the master video stream and the at least one secondary video stream for each pair of consecutive cuts in the master video stream;
   repeatedly select the most common offset having an average minimum absolute error (MAE) below a predefined threshold, such that after a predetermined number of checks the same offset is determined, and starting from that point in the media stream; and
   label a scene in the at least one secondary video stream with the same label as the corresponding scene in the master stream despite the time difference.

7. The system of claim 6, wherein the processor is configured to correspond at least one scene in the master video stream to at least one scene in the at least one secondary video stream based on the determined first set of time differences and the at least second set of time differences; wherein the processor calculates the at least one time offset between the master video stream and the at least one secondary video stream by, for each of the at least one scene in the master video stream, calculating a time offset between at least one of a start time or end time of the at least one scene in the master video stream and at least one of a start time or end time of the at least one corresponding scene in the at least one secondary video stream.

8. The system of claim 7, wherein the processor is configured to
   label the at least one scene in the master video stream corresponding to at least one cut, wherein the at least one cut is a cut immediately before the start of the at least one scene or immediately after the end of the at least one scene; and
   label the at least one scene in the at least one secondary video stream based on the calculated at least one time offset.

9. The system of claim 6, wherein each video stream comprises a plurality of video chunks, and wherein the cuts are determined for each such video chunk.

10. The system of claim 6, wherein the processor is further configured to automatically select the master video stream from the multiple video streams.

11. A method of synchronizing labeling of multiple video streams with a received master video stream, wherein the received master video stream comprises a time stamp for each of a plurality of cuts in the master video stream, the method comprising:
   identifying a corresponding time stamp for each of a plurality of corresponding cuts in at least one secondary video stream;
   determining a first set of time differences between the identified time stamps of each pair of consecutive cuts in the master video stream;

determining at least a second set of time differences between the identified corresponding time stamps of each pair of consecutive cuts in the at least one secondary video stream;

calculating at least one time offset between the master video stream and the at least one secondary video stream for each pair of consecutive cuts in the master video stream;

repeatedly selecting the most common offset having an average minimum absolute error (MAE) below a predefined threshold, such that after a predetermined number of checks the same offset is determined, and starting from that point in the media stream; and labeling a scene in the at least one secondary video stream with the same label as the corresponding scene in the master stream despite the time difference.

12. The method of claim 11, further comprising corresponding at least one scene in the master video stream to at least one scene in the at least one secondary video stream based on the determined first set of time differences and the at least second set of time differences; wherein calculating the at least one time offset between the master video stream and the at least one secondary video stream comprises, for each of the at least one scene in the master video stream, calculating a time offset between at least one of a start time or end time of the at least one scene in the master video stream and at least one of a start time or end time of the at least one corresponding scene in the at least one secondary video stream.

13. The method of claim 12, further comprising:

labeling the at least one scene in the master video stream corresponding to at least one cut, wherein the at least one cut is a cut immediately before the start of the at least one scene or immediately after the end of the at least one scene; and labeling the at least one scene in the at least one secondary video stream based on the calculated at least one time offset and the labeling of the master video stream.

14. The method of claim 11, wherein each video stream comprises a plurality of video chunks, and wherein the cuts are determined for each such video chunk.

\* \* \* \* \*